Figure 3:
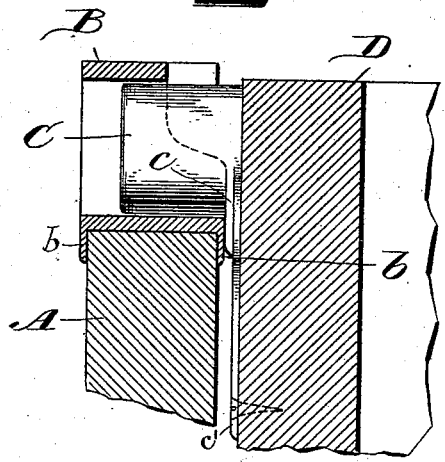

(No Model.) 2 Sheets—Sheet 1.
C. DIETZ.
BEARING AND JOURNAL FOR WASHING MACHINES.
No. 572,745. Patented Dec. 8, 1896.
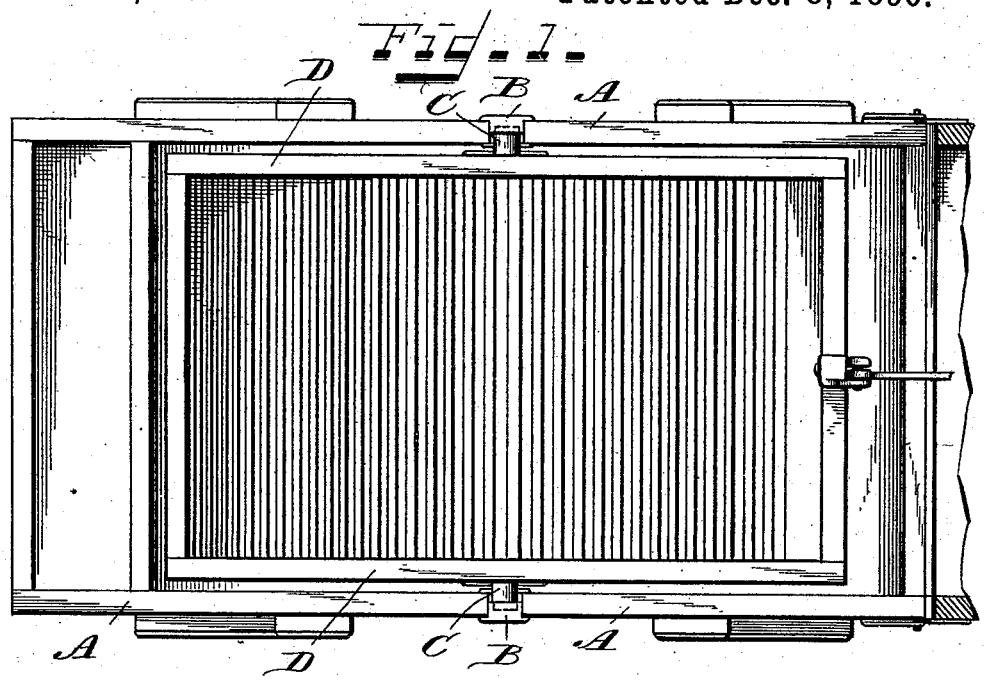
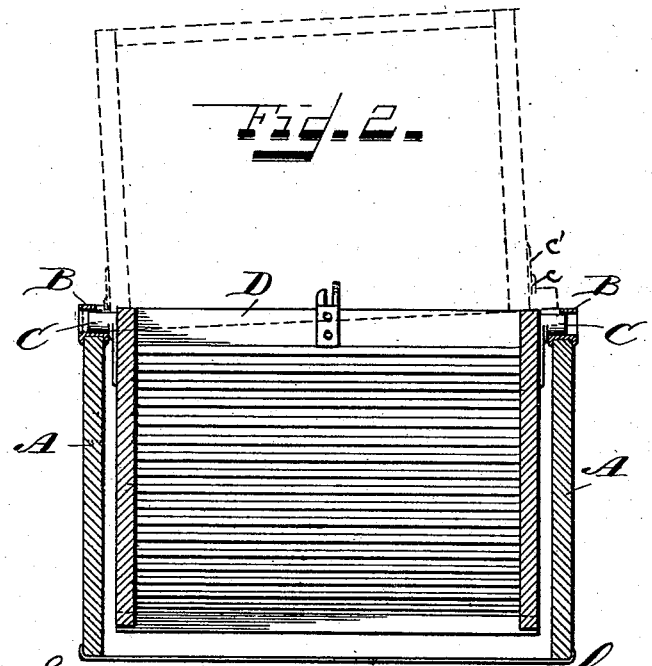
Witnesses.
J. Thomson Cross
Isador Friedlob
Inventor.
Conrad Dietz
By James A. Ramsey
Attorney.

(No Model.) 2 Sheets—Sheet 2.

C. DIETZ.
BEARING AND JOURNAL FOR WASHING MACHINES.

No. 572,745. Patented Dec. 8, 1896.

Witnesses.
J. Thomson Cross
Isador Friedlob

Inventor,
Conrad Dietz
By James F. Ramsey
Attorney.

UNITED STATES PATENT OFFICE.

CONRAD DIETZ, OF WEST COVINGTON, KENTUCKY.

BEARING AND JOURNAL FOR WASHING-MACHINES.

SPECIFICATION forming part of Letters Patent No. 572,745, dated December 8, 1896.

Application filed June 23, 1896. Serial No. 596,644. (No model.)

*To all whom it may concern:*

Be it known that I, CONRAD DIETZ, a citizen of the United States, residing at West Covington, in the county of Kenton and State of Kentucky, have invented certain new and useful Improvements in Bearings and Journals for Washing-Machines, of which the following is a specification.

My invention relates to novel bearings and journals which are primarily intended for use in washing-machines, but which may also be applied to other machines with great advantage.

The object of my invention is to provide simple, effective, and durable bearings and journals for washing-machines which, when placed in and attached to the casing and clothes-receptacle, respectively, and coupled together, securely lock the clothes-receptacle in the casing, as long as said receptacle remains in its normal and operative position, without the use of nuts, bolts, screws, or other supplemental parts than the bearings and journals themselves, and which permit the receptacle to be quickly and easily detached or removed from the casing to allow the interior of the tub or casing to be cleaned and dried without the removal of any bolts, nuts, or other supplemental parts or fastenings.

My invention consists in the construction and arrangement of the bearings and journals, and in the parts and combination of parts shown in the drawings and hereinafter more fully described, and pointed out in the claims.

Figure 5:
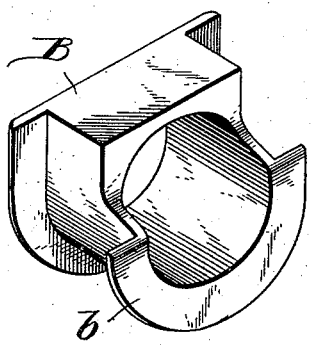
Figure 4:
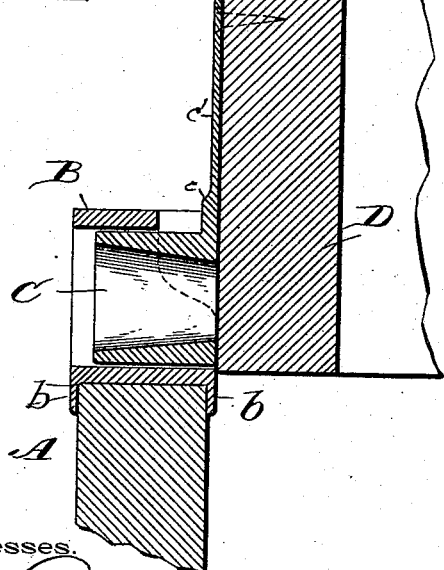
Figure 6:
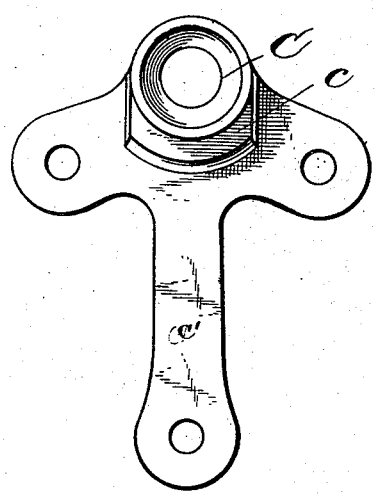

In the drawings, Figure 1 is a top or plan view of a washing-machine with the lid or cover thrown back and broken away for want of space on the sheet, said view showing my improved bearings and journals coupled together with the clothes-receptacle in its operative position. Fig. 2 is a transverse vertical section taken on a central line through the bearings of Fig. 1, the dotted lines showing the position of the clothes-receptacle when out of operative position and inverted for the purpose of removing it from the casing. Fig. 3 is an enlarged detail section taken through one of the journals and its bearing, showing the position of each when the receptacle is in its operative position, as shown by Figs. 1 and 2. Fig. 4 is a similar view showing the journal turned up and pushed outwardly and into the bearing sufficiently to allow the journal on the opposite side to be detached from its bearing, as shown by dotted lines in Fig. 2. Fig. 5 is a detail perspective of one of the bearings. Fig. 6 is a detail of one of the journals.

A represents the casing of a washing-machine; B, the bearings mounted in recesses in the top edges of the sides of the casing; C, the journals mounted on the outer upper central surface of the clothes-receptacle D.

My improved bearings B are preferably constructed of one piece of metal with central longitudinal opening extending therethrough to receive the journal, the upper outer portions of the bearings being closed to hold the journals in place in the bearings and lock the clothes-receptacle in its operative position in the machine, and the upper inner portions of the bearings being cut away or open to permit the disengagement of the bearings and journals and the removal of the clothes-receptacle from the casing of the machine. I have shown my bearings constructed with flat outer tops, the inner portions being open, and circular sides and bottom, though any other suitable shape may be employed. The outer and inner portions of the bearings are provided with suitable flanges to hold them securely in position in the recesses in the top edges of the casing without the use of any other fastening, the inner faces of the inner flanges *b* serving as bearing-surfaces, against which the raised portions or shoulders *c* on the outer faces of the journal ears or extensions abut.

The journals C are preferably constructed of short hollow cylinders having depending ears or extensions *c'*, projecting at right angles from the inner ends of the journals, by which the journals are suitably and securely attached to the outer upper central surface of the clothes-receptacle, said ears being preferably provided with raised portions or shoulders *c* upon their outer surfaces adjacent to the journal, which form bearing-surfaces for the inner flanges of the bearings while the receptacle is in its normal or operative position in the casing or tub, and which serve to prevent the receptacle from moving sidewise in the casing, thereby holding the journals in the closed ends of the bearings and securing them against jumping out of the bearings during the operation of the machine.

It is essential in the construction of my bearings and journals to have a sufficient space between the casing and the clothes-receptacle to allow the receptacle, when inverted, and the inner flanges of the bearings and the raised portions or shoulders on the outer faces of the ears are out of contact with each other, to have sufficient lateral movement of the receptacle to permit one of the journals to be released from its bearing through the open inner top of the bearing. I prefer to prevent lateral movement of the receptacle when it is in its operative position by providing the inner flanges on the bearings and outer shoulders on the journal-ears; but by making the flanges thicker the shoulders may be dispensed with or by making the shoulders thicker the inner flanges may be omitted.

It will be seen that the construction of the bearings and journals are such that the clothes-receptacle cannot be taken out of the casing without inverting it and moving it sidewise in the casing until one of the journals clears the closed outer end of the corresponding bearing, when the receptacle may be raised vertically through the open-top or cut-away portion until the journal on that side is free from its bearing and out of horizontal plane with it, when the entire receptacle may be drawn sidewise over the uncoupled bearing until the opposite journal is free from its bearing. To replace the receptacle in its normal position in the machine, turn the receptacle bottom side up, insert one journal in one of the bearings as far as it will go, then drop the opposite journal into its corresponding bearing through its open-top or cut-away portion, and allow the receptacle to swing downwardly into the casing in its normal or operative position.

I claim—

1. A bearing having outer closed top and lower inner flange adapted to retain a journal therein and an open inner top to permit the journal, when inverted, to be detached therefrom, substantially as set forth.

2. A bearing provided with a closed outer and open inner top in combination with a journal adapted to be moved laterally therein when inverted, and detached therefrom, substantially as set forth.

3. A bearing provided with a cut-out portion on its upper side, in combination with a journal provided with a shoulder on one side, said shoulder being adapted to enter the cut-out portion of the bearing when the journal is inverted, thereby allowing the journal to be moved laterally, and detached, substantially as set forth.

CONRAD DIETZ.

Witnesses:
JAMES M. RAMSEY,
ISADOR FRIEDLOB.